No. 882,245. PATENTED MAR. 17, 1908.
F. W. GIBSON.
TWINE HOLDER.
APPLICATION FILED JULY 19, 1907.
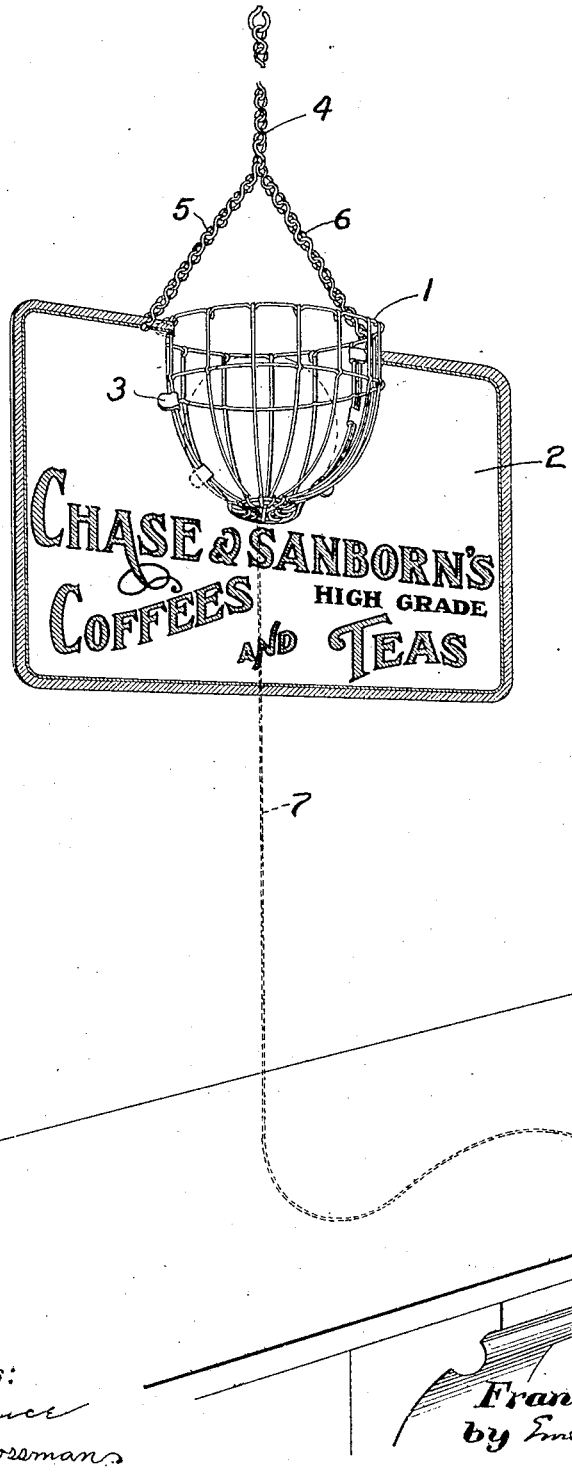
Witnesses:
Edwin T. Luce
Horace H. Crossman
Inventor:
Francis W. Gibson
by Emery & Booth
Attys.
THE NORRIS PETERS CO., WASHINGTON, D. C.

UNITED STATES PATENT OFFICE.

FRANCIS W. GIBSON, OF WEST ROXBURY, MASSACHUSETTS, ASSIGNOR TO THE H. D. BEACH COMPANY, OF COSHOCTON, OHIO, A CORPORATION OF OHIO.

TWINE-HOLDER.

No. 882,245.   Specification of Letters Patent.   Patented March 17, 1908.

Application filed July 19, 1907. Serial No. 384,545.

*To all whom it may concern:*

Be it known that I, FRANCIS W. GIBSON, a citizen of the United States, and a resident of West Roxbury, in the county of Suffolk and State of Massachusetts, have invented an Improvement in Twine-Holders, of which the following description, in connection with the accompanying drawings, is a specification, like letters on the drawings representing like parts.

This invention relates to twine holders, one type or embodiment whereof is shown in the accompanying drawing, wherein is illustrated a perspective view of the invention as it may be employed in practice.

Referring to the drawing and to the single embodiment of the invention therein shown, the twine receptacle is represented at 1, it being of any suitable shape and material. Preferably it is open at the top to permit the ready insertion of the ball of twine and is provided with a bottom opening, through which the twine may be delivered. Preferably the receptacle is of a reticulated or open formation, that the contents may be observed. Herein the said receptacle is formed of wire shaped to afford large meshes or openings.

As hereinafter stated the twine holder is suspended by a preferably flexible connection, in order not to use wall space needed for goods, etc., and therefore in use is necessarily oscillated and not infrequently the twine is split therefrom in the careless or hasty withdrawal of a portion of the twine from the holder. To prevent this, I suitably attach to the receptacle a sheet or plate 2 that presents a relatively large surface and effectively steadies the oscillation of the holder by reason of such comparatively large surface that is presented to the air. The sheet or plate not only reduces the amplitude of the vibration, but steadies the action of the receptacle or holder, making its movements far less abrupt and more uniform. Preferably this sheet is formed or cut to conform substantially to the contour of the twine receptacle and partially encompasses the same as indicated, it being in close proximity to such receptacle and attached thereto in any suitable manner. It is apparent that the shape and extent of the sheet or plate may be varied and that if desired any suitable advertisement receiving body may be employed. Herein the sheet or plate, which is preferably metallic, is provided with projecting tangs 3 that may be integral with the sheet 2 and encompass one or more wires of the twine receptacle.

The twine holder is suspended from an overhead support by a preferably flexible chain or the like represented at 4, and herein shown as having portions 5 and 6 respectively connected to portions of the sheet or plate 2 upon opposite sides of the twine receptacle and in such manner as to support the twine holder in equipoise. The end of the twine depending from the twine receptacle is indicated in dotted lines at 7.

The device is intended to be suspended in a store above the counter so as to be in plain sight of customers and convenient for use.

When twine is needed to tie a parcel purchased by a customer, the merchant pulls upon the protruding end 7 of the twine and, in doing so, unconsciously imparts an oscillating or swaying motion to the entire twine holder, thus attracting the attention of the customer to any advertisement that may be placed upon the sheet or plate 2. It is apparent that the device herein disclosed is compact and presents a unitary structure, herein composed of the twine receptacle, the sheet or plate, and the chain 4. The sheet or plate 2 acts to balance the receptacle and to steady the movements thereof when the twine is drawn upon.

Having thus described one type of embodiment of my invention, I desire it to be understood that although specific terms are employed, they are used in a generic and descriptive sense and not for purposes of limitation, the scope of the invention being set forth in the following claims.

Claims.

1. A twine holder comprising a reticulated, open topped twine receptacle having an opening in the lower portion thereof, through which the twine may be delivered for use, a steadying sheet or plate, said sheet or plate having a portion thereof shaped to conform substantially to the outline of said twine receptacle and partially encompassing the same, there being means for permanently securing said sheet or plate and said twine receptacle so that the former partially encompasses the twine holder, and flexible means for suspending said twine holder from an overhead support, said suspending means being connected to said sheet or plate, thereby to support the twine holder, the connection of the suspending means to the sheet or plate being such that the latter is maintained in equipoise, the twine receptacle being balanced by the said sheet or plate, thereby maintaining the receptacle with its mouth upright when the twine is drawn upon for use and steadying the movements thereof.

2. A twine holder comprising a twine receptacle from which the twine may be delivered for use, a steadying sheet or plate, said sheet or plate being shaped to conform to the contour of the twine receptacle and partially encompassing the same and being connected to said twine receptacle to move therewith, and means for suspending said twine holder from an overhead support, said suspending means being connected to said sheet or plate, thereby to support the twine holder, the connection of the suspending means to the sheet or plate being such that the latter is maintained in equipoise the twine receptacle being balanced by the said sheet or plate, thereby maintaining the receptacle with its mouth upright when the twine is drawn upon for use and steadying the movements thereof.

3. A twine holder comprising a twine receptacle from which the twine may be delivered for use, a steadying sheet or plate presenting a relatively large substantially plane surface, said sheet or plate being connected to said twine receptacle to move therewith, and flexible means for suspending said twine holder from an overhead support, said suspending means being connected to said twine holder to support the same, the connection of the suspending means to the twine holder being such that the sheet or plate is maintained in equipoise the twine receptacle being balanced by the said sheet or plate, thereby maintaining the receptacle with its mouth upright when the twine is drawn upon for use and steadying the movements thereof.

4. A twine holder comprising a twine receptacle from which the twine may be delivered for use, a steadying sheet or plate presenting a relatively large substantially flat surface, said sheet or plate being connected to said twine receptacle to move therewith, and means for suspending said twine holder from an overhead support, said suspending means being connected to said twine holder to support the same, the connection being such that the twine receptacle and sheet or plate are maintained in equipoise, the twine receptacle being balanced by the said sheet or plate, thereby maintaining the receptacle with its mouth upright when the twine is drawn upon for use and steadying the movements thereof.

5. A twine holder comprising an open topped wire mesh twine receptacle having an opening in the lower portion thereof, through which the twine may be delivered for use, a metallic sheet or plate, said sheet or plate having a portion thereof shaped to conform substantially to the outline of said twine receptacle and partially encompassing the same and in close proximity thereto, said sheet or plate having projecting tangs, whereby the sheet or plate may be attached to the twine receptacle, and a chain for suspending said twine holder from an overhead support, said chain being connected to said sheet or plate upon opposite sides of the twine receptacle, the connection of the chain to the sheet or plate being such that the latter is maintained in equilibrium, the twine receptacle being balanced by the said sheet or plate, thereby maintaining the receptacle with its mouth upright when the twine is drawn upon for use and steadying the movements thereof.

In testimony whereof, I have signed my name to this specification, in the presence of two subscribing witnesses.

FRANCIS W. GIBSON.

Witnesses:
FREDERIC GILBERT BAUER,
IRVING U. TOWNSEND.